United States Patent
Cohen et al.

(10) Patent No.: US 7,355,705 B1
(45) Date of Patent: Apr. 8, 2008

(54) USING A FIXED-FREQUENCY OSCILLATION IN A DISPERSIVE SPECTROMETER TO MEASURE SCENE INHOMOGENEITY

(75) Inventors: Douglas Lent Cohen, Fort Wayne, IN (US); David James Crain, Grabill, IN (US); Richard James Hertel, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 398 days.

(21) Appl. No.: 11/159,883

(22) Filed: Jun. 23, 2005

(51) Int. Cl.
*G01J 3/28* (2006.01)
(52) U.S. Cl. ...................... 356/326; 356/328
(58) Field of Classification Search ............... 356/326, 356/328, 450–452
See application file for complete search history.

(56) References Cited

U.S. PATENT DOCUMENTS

| | | | |
|---|---|---|---|
| 4,676,642 A * | 6/1987 | French | 356/451 |
| 5,621,526 A | 4/1997 | Kuze | |
| 5,784,158 A | 7/1998 | Stanco et al. | |
| 5,835,214 A * | 11/1998 | Cabib et al. | 356/452 |
| 6,297,504 B1 | 10/2001 | Andreou | |
| 6,816,258 B2 | 11/2004 | Hutchin | |
| 6,836,325 B2 * | 12/2004 | Maczura et al. | 356/328 |
| 7,259,861 B1 * | 8/2007 | Crain et al. | 356/451 |
| 2004/0135895 A1 * | 7/2004 | Wiedmann | 348/216.1 |

OTHER PUBLICATIONS

Choongyeun Cho et al., "Stochastic Cloud Clearing of Hyperspectral Radiances Observed by the Atmospheric Infrared Sounder (AIRS) on the Aqua Satellite", Massachusetts Institute of Technology, Research Laboratory Electronics.
James B. Abshire et al., "Laser Sounder Approach for Measuring Atmospheric CO2 from Orbit", NASA Goddard Space Flight Center, pp. 1-6.

* cited by examiner

*Primary Examiner*—Layla G. Lauchman
(74) *Attorney, Agent, or Firm*—RatnerPrestia

(57) ABSTRACT

A method for measuring scene inhomogeneity includes the steps of directing radiance of a scene into a dispersive spectrometer, and changing the field-of-view (FOV) of the spectrometer, while directing the radiance of the scene into the spectrometer. The method then processes the radiance of the scene to obtain a signal. The method also includes measuring an amplitude of the signal and determining scene inhomogeneity based on the measured amplitude of the signal. The method may include uniformly oscillating the FOV of the spectrometer and, next, obtaining a sinusoidal signal, based on uniformly oscillating the FOV of the spectrometer.

20 Claims, 7 Drawing Sheets

USING A FIXED-FREQUENCY OSCILLATION IN A DISPERSIVE SPECTROMETER TO MEASURE SCENE INHOMOGENEITY

TECHNICAL FIELD

The present invention relates, in general, to a method and apparatus for observation of atmospheric spectra or scene spectral radiance. More specifically, the present invention relates to a method and apparatus for measuring scene inhomogeneity, by providing a repetitive pattern of line-of-sight (LOS) oscillation for a field-of-view (FOV) of a dispersive spectrometer.

BACKGROUND OF THE INVENTION

In a typical dispersive spectrometer, a scene is imaged onto a slit so that light from a thin region of the scene passes through the slit. Light from the thin region of the scene is then collimated, passed through a dispersive element such as a prism or grating, and imaged onto a focal plane. The resulting image on the focal plane is a spread spectrum image of the thin region of the scene passed through the slit. Thus, the spectrum of each pixel of the image from the slit may be recorded by a focal plane array. Usually, the slit is scanned over the image of the scene to create what is commonly called a data cube in which the spectrum for each slit pixel in a two-dimensional scene is stored.

A dispersive spectrometer may be used to examine a light source, it may be used to examine the reflectance characteristics of an object illuminated by the light source, or it may be used to measure the absorption characteristics of material when illuminated by a light source, to name but a few uses.

Referring to FIG. 6, there is shown a conventional dispersive spectrometer, generally designated as 60. As shown, dispersive spectrometer 60 uses prism 66 to disperse light into its constituent wavelengths. Radiant energy from scene 61 is collected by primary lens 62 and focused onto slit 63. Light from a thin portion of scene 61 passes through slit 63 and is collimated by lens 64. Prism 66 disperses the collimated light into its constituent wavelengths, according to the refractive properties of prism 66. The prisms role can be replaced by a reflective or transmissive grating without changing the basic nature of the spectrometer.

As shown, the resulting dispersed light is imaged by focusing lens 67 onto focal plane 70. As also shown, focal plane array 68 is disposed at focal plane 70 to detect the dispersed light from prism 66. The signal generated by focal plane array 68 is read out, digitized, and stored as data in data acquisition system 69. The data may be accessed by computer 65 for further processing and display.

The dispersive spectrometer shown in FIG. 6, as well as other dispersive spectrometers, are disclosed in greater detail in U.S. Pat. No. 6,816,258, issued to Richard Hutchin, on Nov. 9, 2004. The content of the patent is incorporated herein by reference in its entirety.

A broad spectrum spectrometer system, generally designated as 71, is shown in FIG. 7. As shown, light 80 enters module 79 which disperses the light into its constituent wavelengths. Module 79 may include a prism for dispersing the light. The spectrally dispersed light, generally designated as 78, passes through slit 74 before reaching detector array 73. Detector array 73 includes individual detectors 72. Each detector 72 may be tuned, or filtered, to sense light within a predetermined spectral region.

As shown, slit 74 is designed to be of a variable size in the vertical dimension, generally designated as 75. Accordingly, if the dispersed light at the edge of spectrum 78 is ultraviolet (UV) and the middle of the spectrum is in the visible range, then the spectrum becomes uniform in intensity upon reaching detectors 72. Uniform intensity is achieved by the variable sized slit, as the visible light in the middle region of a narrow slit is much more attenuated than the ultraviolet light at an end region of a wider slit.

The dispersive spectrometer system shown in FIG. 7 is described in more detail in U.S. Pat. No. 5,784,158, issued to Stanco, et al., on Jul. 21, 1998, and is incorporated herein by reference in its entirety.

Conventional dispersive spectrometers assume that the scene radiance does not vary while the radiance spectrum is being measured. If the scene radiance does in fact vary—for example, because the line of sight (LOS) of the instrument changes for an inhomogeneous scene—then the radiance spectrum may not be accurately measured. If the LOS change is random, this may become a significant contribution to the random measurement error. In meteorological sounding applications using dispersive spectrometers, the scene inhomogeneity caused by the presence of clouds is a significant source of noise or uncertainty when trying to determine the cloud-free radiances. Conventional retrieval algorithms attempt to remove inhomogeneity using methods such as "cloud clearing," "hole hunting," and various other cloud-masking techniques. None of these methods, however, can unambiguously determine the degree of scene inhomogeneity for an individual field-of-view (FOV), because they require observation of multiple or adjacent fields of view.

Determining the degree of scene inhomogeneity for each observed instrument FOV, independently of cloud-clearing or other method, could significantly improve the accuracy of the sounding algorithms used to retrieve atmospheric parameters of interest. Knowing that the FOV contains a homogeneous scene would also be advantageous, because it would permit neglecting the effect of small, uncontrollable, and random LOS changes on the measured spectra.

SUMMARY OF THE INVENTION

To meet this and other needs, and in view of its purposes, the present invention provides a method for measuring scene inhomogeneity having the following steps: (a) directing radiance of a scene into a dispersive spectrometer; (b) changing a field-of-view (FOV) of the spectrometer, while directing the radiance of the scene into the spectrometer; (c) processing the radiance of the scene to obtain a signal; (d) measuring an amplitude of the signal; and (e) determining scene inhomogeneity based on the measured amplitude of the signal.

In one aspect of the invention, step (b) includes uniformly oscillating the FOV of the spectrometer; and step (c) includes obtaining a sinusoidal signal based on uniformly oscillating the FOV of the spectrometer. In another aspect of the invention, step (b) includes using a periodic waveform to change the FOV of the spectrometer; and step (c) includes obtaining a signal having a periodic waveform proportional to the periodic waveform used to change the FOV of the spectrometer. Step (b) may include changing the FOV of the spectrometer using one of a sinusoidal waveform, a pulse code modulated waveform, or a pseudo-random waveform; and step (c) may include obtaining a signal having a waveform proportional to the waveform used to change the FOV of the spectrometer.

In yet another aspect of the invention, step (b) of the method includes periodically changing the LOS of the spectrometer at a frequency of f and at an amplitude of about 5 percent of the length of L in FIG. 1, and periodically changing the LOS at a time interval that is about ten times shorter than a dwell time of the LOS. Furthermore, step (e) of the method includes determining that the scene is inhomogeneous, when the measured amplitude of the signal is larger than a noise component of the signal, and determining that the scene is homogeneous, when the measured amplitude of the signal is equal to or smaller than the noise component of the signal.

Another embodiment of the invention is a system for measuring scene inhomogeneity. The system includes a dispersive spectrometer having a field-of-view (FOV) for receiving radiance of a scene, and a controller coupled to the dispersive spectrometer for changing the FOV. The system also includes a detector for detecting an amplitude of the received radiance of the scene, and a processor for determining scene inhomogeneity, based on the amplitude of a signal provided from the detector.

In an aspect of the invention, the controller is configured to modulate the FOV at a periodic interval, using one of a sinusoidal waveform, a pulse code modulated waveform, or a pseudo-random waveform. The processor is configured to determine scene inhomogeneity, based on the signal provided from the detector having a waveform similar to the waveform used to modulate the FOV by the controller.

In another aspect of the invention, the detector includes a spectral bin for detecting the radiance of the scene at a predetermined wavelength. In yet another aspect, the detector includes a focal planar array (FPA) for detecting the radiance of the scene and providing multiple output signals from the FPA, and the processor includes an adder for summing the multiple output signals from the FPA.

The processor is configured to determine that the scene is inhomogeneous, when the amplitude of the signal is larger than a noise component of the signal, and the processor is configured to determine that the scene is homogeneous, when the measured amplitude of the signal is equal to or smaller than the noise component of the signal.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
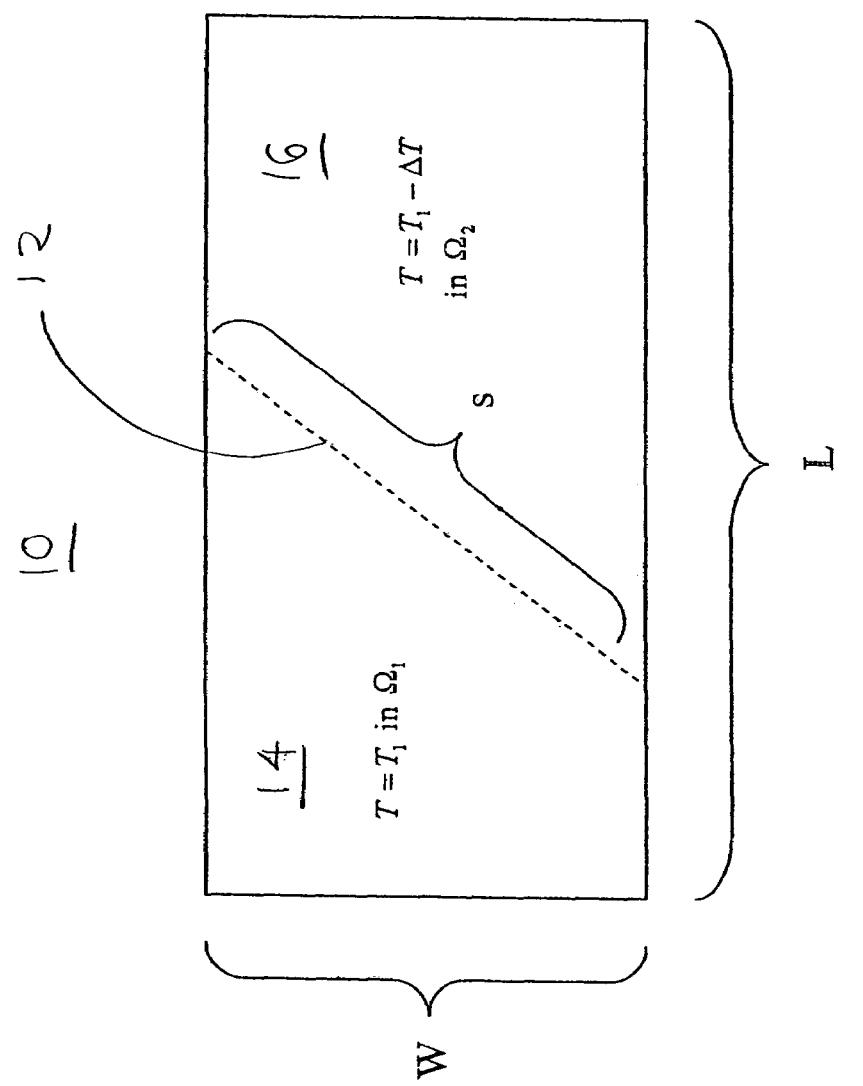
FIG. 1 is a planar view of an exemplary field-of-view (FOV) seen by a dispersive spectrometer for measuring scene inhomogeneity, in accordance with an embodiment of the present invention.

The inventors discovered that when placing a small, uniform oscillation on a dispersive spectrometer's LOS, and the interferometer is observing a scene which is inhomogeneous at the edges of the FOV, then the spectrometer output contains an oscillating signal whose amplitude is proportional to the degree of scene inhomogeneity present. When this oscillation is small or undetectable, then the scene is only slightly inhomogeneous. If the opposite is true, then the scene is significantly inhomogeneous.

To provide mathematical structure to the present invention, the following model for a dispersive spectrometer viewing an inhomogeneous scene will now be explained.

A dispersive spectrometer typically includes an array of detectors, such as a focal planar array of pixels. The detector for one spectral bin, or one pixel, of such a dispersive spectrometer collects photons at wavelengths between $\lambda$ and $\lambda + \Delta\lambda$. The detector absorbs a photon flux F such that $$F(T) = \Lambda_b + \left[\eta \cdot \tau \cdot \left(\frac{\lambda}{hc}\right) A \cdot \Omega \cdot B(\lambda, T) \cdot \Delta\lambda\right] \quad (1a)$$

where the spectrometer is observing Planck radiance at temperature T and the detector is experiencing a background photon flux of $\Lambda_b$. The photon flux F has units of photons/sec and T is in deg K. The spectrometer's entrance aperture has an area A in $cm^2$, and $\Omega$ is the solid angle of the pixel's FOV in steradians.

The dimensionless optical transmission from the entrance aperture to the pixel detector is r, and the dimensionless quantum efficiency of the pixel detector is $\eta$. Planck's constant is $$h \approx 6.625 \times 10^{-27} \text{ erg} \cdot \text{sec}$$

and the speed of light is $$c \approx 2.998 \times 10^{10} \text{ cm/sec}.$$

The formula for the Planck radiance in empty space is (in units of $erg/sec/cm^3/ster$)

$$B(\lambda, T) = \frac{2hc^2}{\lambda^5 (e^{\frac{hc}{\lambda kT}} - 1)}. \quad (1b)$$

In equations (1a) and (1b), the wavelength $\lambda$ and wavelength interval $\Delta\lambda$ are in cm.

FIG. 1 is an exemplary FOV seen by one pixel. As shown, this FOV, generally designated as 10, is rectangular, with L and W being the length and width, respectively (both are in radians). Assuming a simple inhomogeneous scene, an arbitrary boundary of length s (designated as 12) is drawn to divide the scene. The boundary is shown as a straight line for purposes of explanation. The boundary divides the original $\Omega$ solid angle of the pixel FOV into two smaller solid angles, designated as 14 and 16, and referred to as $\Omega_1$ and $\Omega_2$, respectively. The effective black-body temperature of the Planck radiance coming from $\Omega_1$ is $T_1$ and the effective black-body temperature of the Planck radiance coming from $\Omega_2$ is $$T_2 = T_1 - \Delta T. \tag{2a}$$

The three solid angles are, of course, in steradians, all temperatures are in deg K, and $T_1$ is assumed to be greater than or equal to $T_2$. The LOS of the pixel is oscillated at frequency $f_0$, and there is a component of this oscillation perpendicular to the boundary of length s.

The $\Omega_1$ and $\Omega_2$ are functions of time t with $$\Omega_1(t) = \Omega_1^{(0)} + s\theta_0 \cos(2\pi f_0 t) \tag{2b}$$

and $$\Omega_2(t) = \Omega_2^{(0)} - s\theta_0 \cos(2\pi f_0 t) \tag{2c}$$

where $\theta_0$ is the amplitude (in radians) of the oscillation component perpendicular to the boundary. If the LOS swings so that $\Omega_1$ increases, then $\Omega_2$ decreases; and if the LOS swings so that $\Omega_2$ increases, then $\Omega_1$ decreases. Consequently, as shown by equations (2a) and (2b), $$\Omega_1(t) + \Omega_2(t) = \Omega_1^{(0)} + \Omega_2^{(0)} = \text{constant}.$$

The total size of the pixel's FOV does not change from the original $\Omega$ value when the LOS changes, so $$\Omega_1(t) + \Omega_2(t) = \Omega_1^{(0)} + \Omega_2^{(0)} = \Omega. \tag{2d}$$

It will be appreciated that, for small oscillations, equations (2a) through (2d) apply to any shape FOV, where the LOS is changing across a straight-line boundary of length s, not just for rectangular FOVs where $$\Omega = WL. \tag{2e}$$

When the LOS of a dispersive spectrometer's pixel oscillates at frequency $f_0$, the formula for the photon flux absorbed by the pixel is no longer given by equation (1a), but instead by $$F = \Lambda_b + \eta \cdot \tau \cdot \left(\frac{\lambda}{hc}\right) A \cdot \Delta\lambda \cdot [\Omega_1(t) B(\lambda, T_1) + \Omega_2(t) B(\lambda, T_2)]$$

which becomes, substituting from equations (2a) through (2c), $$F(t, T_1, \Delta T) = \Lambda_b + \alpha[\Omega_1^{(0)} B(\lambda, T_1) + \Omega_2^{(0)} B(\lambda, T_1 - \Delta T)] + \alpha s\theta_0 \cos(2\pi f_0 t) \cdot [B(\lambda, T_1) - B(\lambda, T_1 - \Delta T)] \tag{3a}$$

where $$\alpha = \eta \cdot \tau \cdot A \cdot \left(\frac{\lambda}{hc}\right) \cdot \Delta\lambda \tag{3b}$$

and the photon flux F has been written as a function of t, $T_1$, and $\Delta T$.

The electric current I leaving the pixel is proportional to F with a constant of proportionality R. The electric current may be written as a function of t, $T_1$, and $\Delta T$ as follows $$I(t, T_1, \Delta T) = R \cdot F(t, T_1, \Delta T)$$

which becomes, upon substituting from equation (3a), $$I(t, T_1, \Delta T) = R\Lambda_b + \alpha R[\Omega_1^{(0)} B(\lambda, T_1) + \Omega_2^{(0)} B(\lambda, T_1 - \Delta T)] + \alpha Rs\theta_0 \cos(2\pi f_0 t) \cdot [B(\lambda, T_1) - B(\lambda, T_1 - \Delta T)]. \tag{4a}$$

The signal current I contains noise, which may be larger than the naturally occurring photon noise, but may never be smaller than the noise. To detect the presence of an inhomogeneous scene, the present invention detects the time-varying signal component of $$\alpha Rs\theta_0 \cos(2\pi f_0 t) \cdot [B(\lambda, T_1) - B(\lambda, T_1 - \Delta T)]$$

in the presence of photon noise. Such detection is the electronic equivalent of taking the Fourier transform of I and then confirming that the $f_0$ frequency component is substantially larger than its photon-noise value.

The dispersive spectrometer examines the scene while oscillating the spectral bin or pixel LOS at frequency $f_0$ for a time $\Delta t$. Under these circumstances, the signal-to-noise ratio (SNR) for detecting scene inhomogeneity in the presence of photon noise is $$SNR = \alpha s\theta_0 \sqrt{\frac{\Delta t}{2F_{tot}}} \cdot [B(\lambda, T_1) - B(\lambda, T_1 - \Delta T)] \tag{4b}$$

where $$F_{tot} = \Lambda + \alpha[\Omega_1^{(0)} B(\lambda, T_1) + \Omega_2^{(0)} B(\lambda, T_2)] \tag{4c}$$

which is the total photon flux, from both the scene and the background, absorbed by the detector pixel.

The SNR predicted by equation (4b) may be calculated, for example, using parameter values from the Atmospheric Infrared Sounder (AIRS), a dispersive spectrometer system, presently in orbit, measuring infrared atmospheric spectra. The data used in this calculation comes from "Development and Test of the Atmospheric Infrared Sounder (AIRS) for the NASA Earth Observing System (EOS)" by P. Morse et. al. from Lockheed-Martin IR Imaging Systems and M. Chahine et. al. from the Jet Propulsion Laboratory, CalTech.

In AIRS, the FOV is approximately rectangular, with an approximate length $$L \cong 1.1 \text{ deg.} \cong 0.0192 \text{ rad.}$$

and an approximate width $$W \cong 0.6 \text{ deg.} \cong 0.0105 \text{ rad.}$$

The length of the boundary, shown in FIG. 1, may be set to its minimum possible value of s=W, and the oscillation amplitude $\theta_0$, which is perpendicular to the boundary is taken to be 5% of L. The dwell time for AIRS is $$\Delta t = 22.4 \text{ millisec.}$$

and the frequency of the LOS oscillation is set to $$f_0 = 446.4 \text{ Hz.}$$

This provides about ten oscillations during a dwell time.

It will be appreciated that there is nothing special about the size of $f_0$, as long as it is reasonably large in comparison to the dwell time, and the LOS oscillation may occur at a desired frequency. The dimensionless $\tau$ and $\eta$ parameters in equations (1a) and (3b) are given the following values, which are typical of this type of instrument:

$$\tau = 0.4 \text{ and } \eta = 0.8.$$

The area of the AIRS entrance aperture in equations (1a) and (3b) is $$A \cong 0.224 \text{ cm}^2$$

for the wavelength $\lambda=10$ μm, at which the SNR in equation (4b) is evaluated. Using AIRS performance data, at $\lambda=10$ μm, the detector noise at this wavelength is due almost entirely from background photons, rather than scene photons. This means that $$F_{tot} \cong \Lambda_b$$

in equation (4c). Using an NEdT value of 0.06 deg K, based on the AIRS specification, at a reference temperature of 250 deg K, provides the following estimate:

$$F_{tot} \cong 5 \times 10^9 \text{ photons/sec.}$$

The value of $\Delta\lambda$ for a single detector pixel, based on the AIRS specification, is the following:

$$\frac{\lambda}{\Delta\lambda} \cong 1200$$

at $\lambda=10$ μm.

Figure 2:
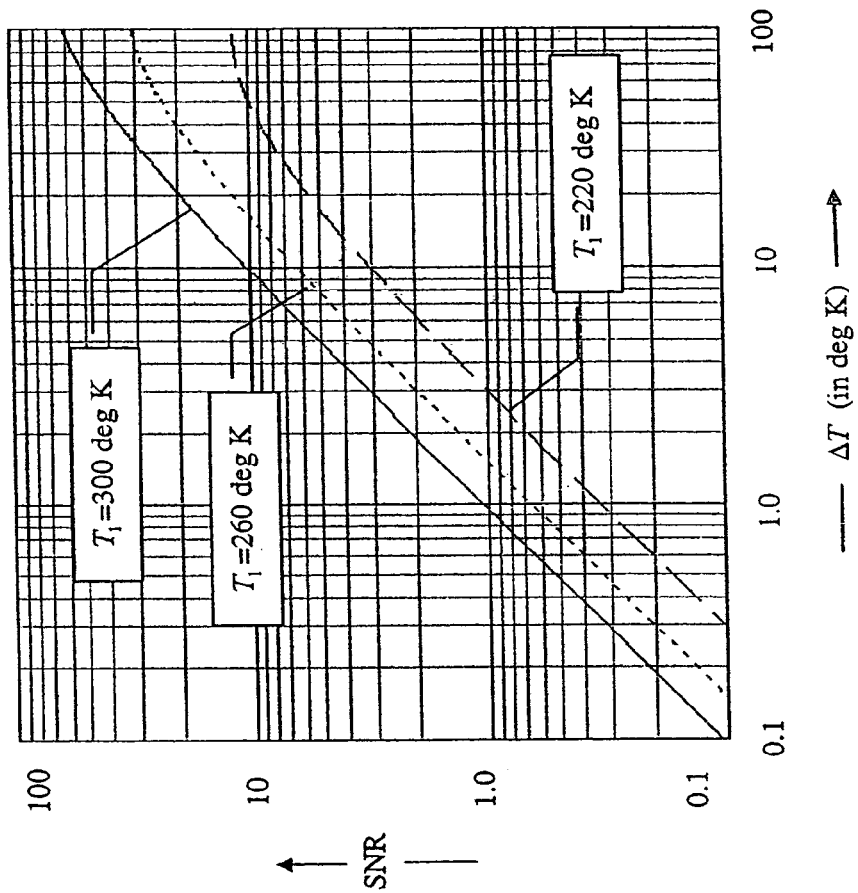
FIG. 2 is a plot of signal to noise ratio (SNR) versus change in temperature in degrees Kelvin, as seen by a dispersive spectrometer, in accordance with an embodiment of the present invention.

These AIRS parameter values may be substituted into the SNR formula of equation (4b) to obtain different sets of exemplary SNR curves. FIG. 2 depicts SNR curves for three different $T_1$ values of 300 deg K, 260 deg K, and 220 deg K. It may be seen that, for all three temperatures, a scene inhomogeneity of the type shown in FIG. 1 is easily detectable for $\Delta T$ values greater than 10 deg K. At temperature differences greater than 10 deg K, the plotted SNR values are well above a value of three, which is considered to be a reliable threshold for detection.

It will be appreciated that these curves characterize a single spectral bin of the measured radiance spectrum at $\lambda=10$ μm. Accordingly, the present invention may detect the presence of scene inhomogeneity in each of the spectral bins near this wavelength of 10 microns.

Referring back to equation (4a), it may be seen that the measured amplitude of the detected oscillation is proportional to the radiance difference of $$B(\lambda,T_1)-B(\lambda,T_1-\Delta T),$$

where wavelength is a variable. Accordingly, FIG. 2 also predicts an ability to observe the difference in the shape of radiance curves near $\lambda=10$ μm, and shows that oscillation of the LOS is able to detect scene inhomogeneities due to variable amounts of trace gases, as revealed by the variable intensities of their emission or absorption lines.

The previous description pertained to detecting scene inhomogeneities based on detecting a signal from one spectral bin or pixel. In another embodiment of the present invention, the SNR may be increased by adding together the signals from a large number of spectral bins or a large number of pixels in the focal planar array. This would increase the ability of the system to detect non-spectral scene inhomogeneities, for example a cloud edge, because the signals from the large number of spectral bins, when added together, increase the SNR.

Figure 3:
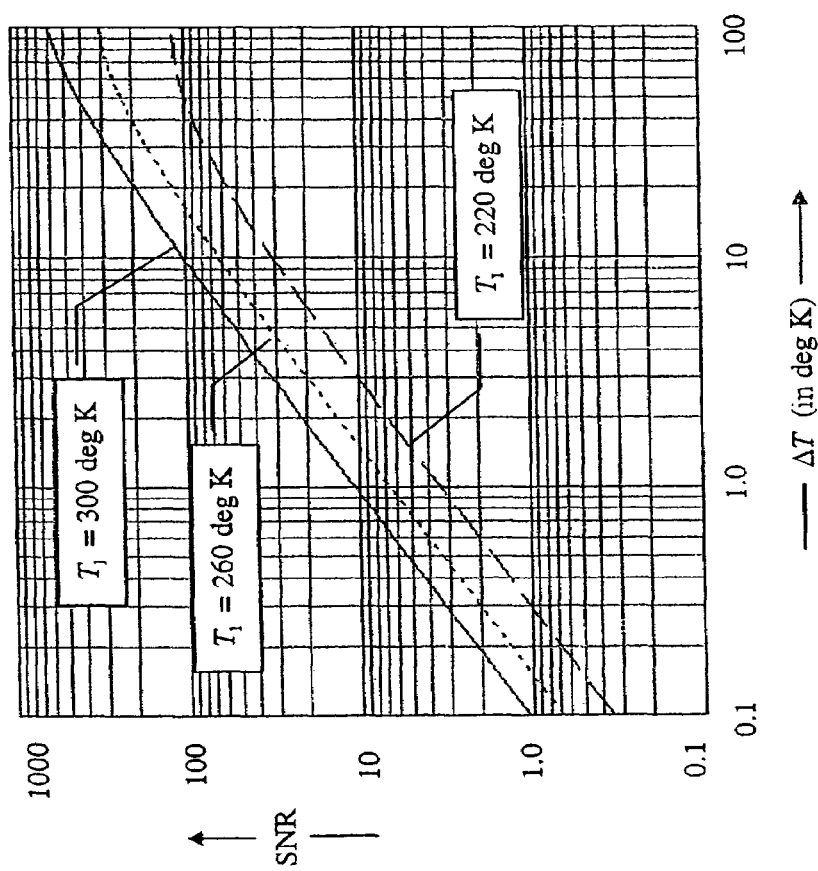
FIG. 3 is another plot of signal to noise ratio (SNR) versus change in temperature in degrees Kelvin, as seen by another dispersive spectrometer, in accordance with an embodiment of the present invention.

FIG. 3 shows the result of the SNR when the signals from 100 spectral bins near $\lambda=10$ μm (for example between $\lambda=9.6$ μm and $\lambda=10.4$ μm for AIRS) are added together. For the same three temperatures, as described for FIG. 2 ($T_1$ at 300 deg K, 260 deg K, and 220 deg K), it may be seen that the present invention can now detect scene inhomogeneities less than 1 deg K in temperature. When the signals are aggregated from more spectral bins or pixels, the present invention is able to detect even smaller temperature differences.

In another embodiment of the invention, the FOV of the dispersive spectrometer may be oscillated using a periodic waveform that is different from a cosine waveform. Any small, predictable set of changes in the LOS of the FOV may be used in place of the cosine oscillation described before. For example, the LOS may be changed using pulse-code modulation, any other type of periodic waveform, or even a known pseudo-random pattern.

When the scene inhomogeneity does not have the form shown in FIG. 1, oscillating the LOS of the dispersive spectrometer may still produce a detectable signal, so long as regions of greater or lesser temperatures of trace-gas concentrations move into and out of a scene at the edges of the FOV. To increase the likelihood that this may happen, an embodiment of the invention increases the number of "edges" in the FOV, by having the dispersive spectrometer view a scene through a grid. The number of edges may be increased, for example, by using the grid shown in FIG. 4.

As shown, field-of-view 40 includes two regions divided by a straight line, generally designated as 12 (The straight line may be similar to the straight line dividing the field-of-view shown in FIG. 1). A grid, generally designated as 42, may be added at the input side of light gathering optics 54 (shown in FIG. 5). In this manner, the incoming light from the scene has to pass through grid 42, before passing through the slit (slit 57 in FIG. 5).

Figure 4:
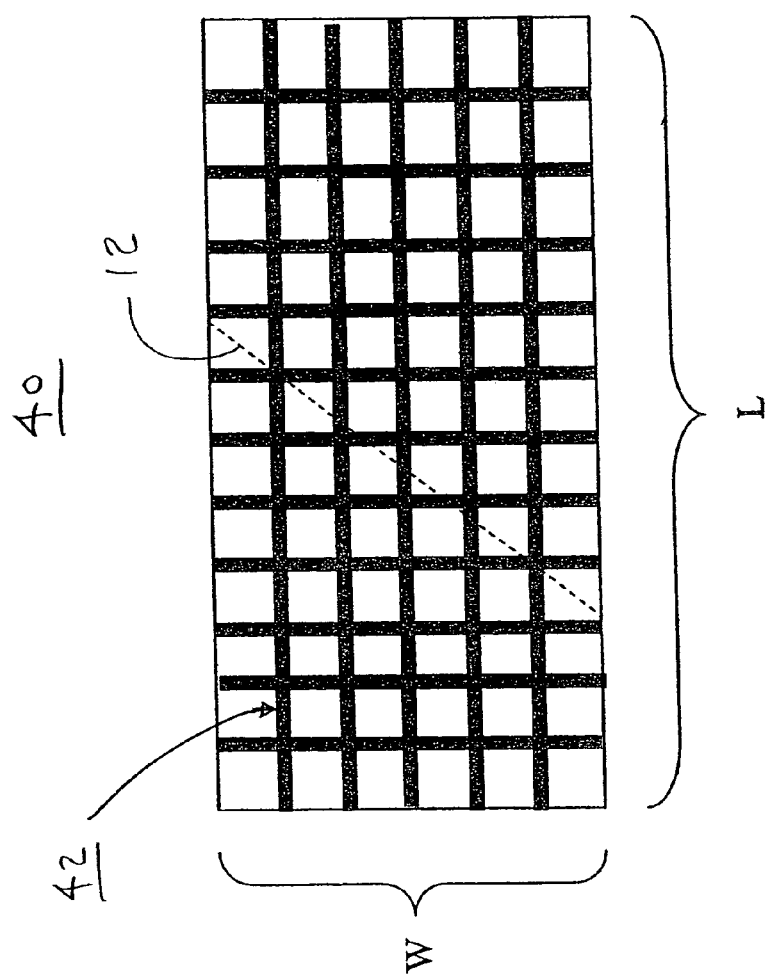
FIG. 4 is an exemplary view of a field-of-view (FOV) seen by a dispersive spectrometer system, when viewing a scene through a grid, in accordance with an embodiment of the present invention.

The grid shown in FIG. 4 is only one example of a grid that may be utilized by the present invention. Any grid boundary, acting like a FOV edge, is effective in producing an enhanced signal, as inhomogeneous scene regions move back and forth across the extra edges formed by the grid.

Figure 5:
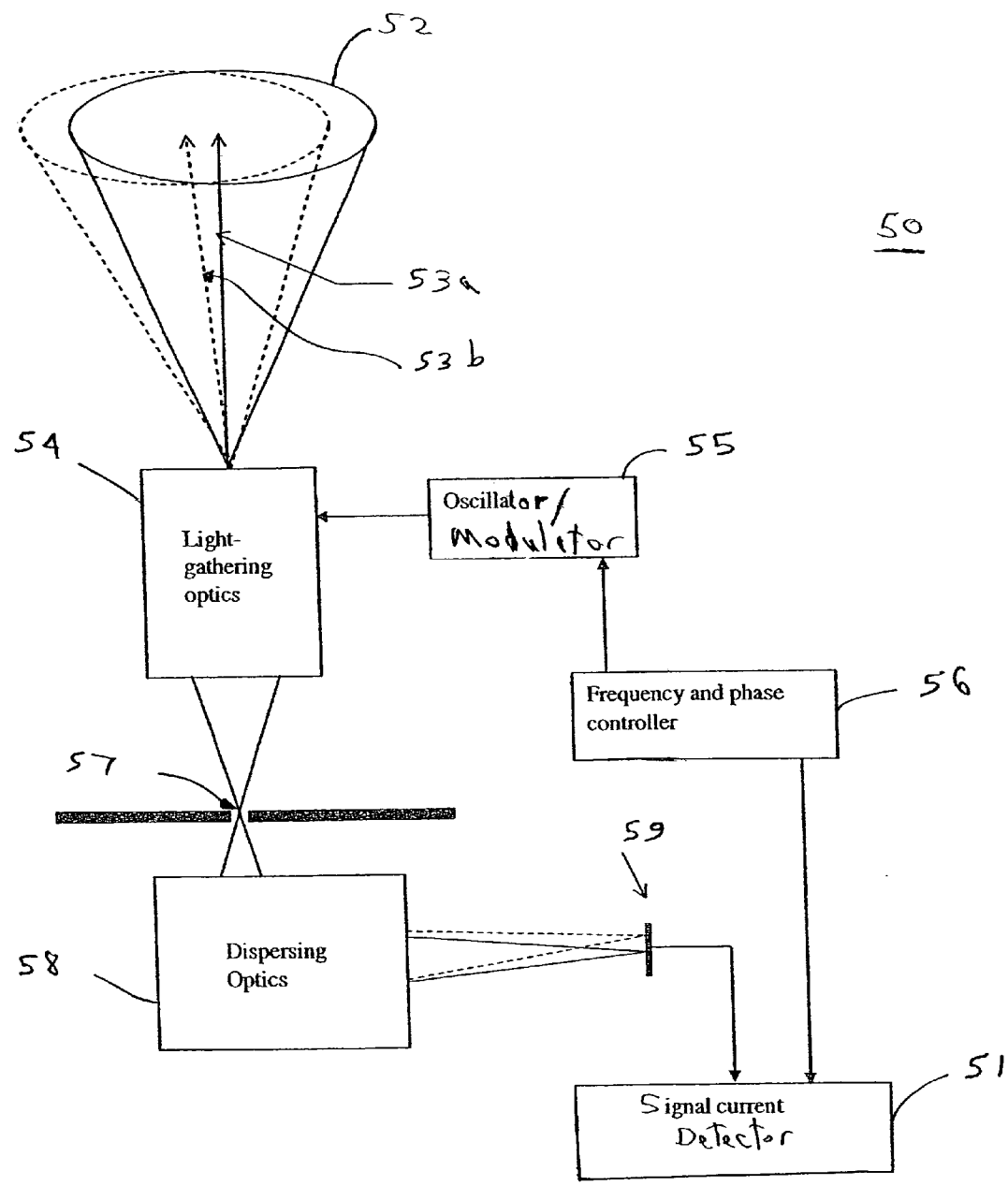
FIG. 5 is a block diagram of an exemplary dispersive spectrometer system, in accordance with an embodiment of the present invention.
Figure 6:
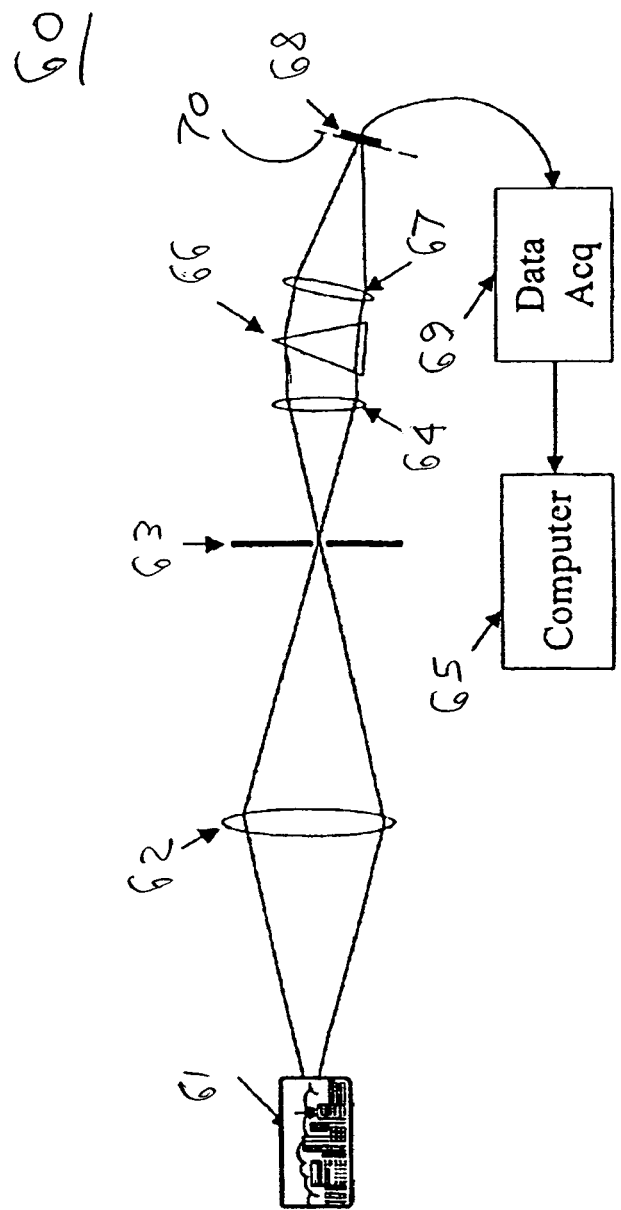
FIG. 6 is a schematic diagram of a conventional dispersive spectrometer.
Figure 7:
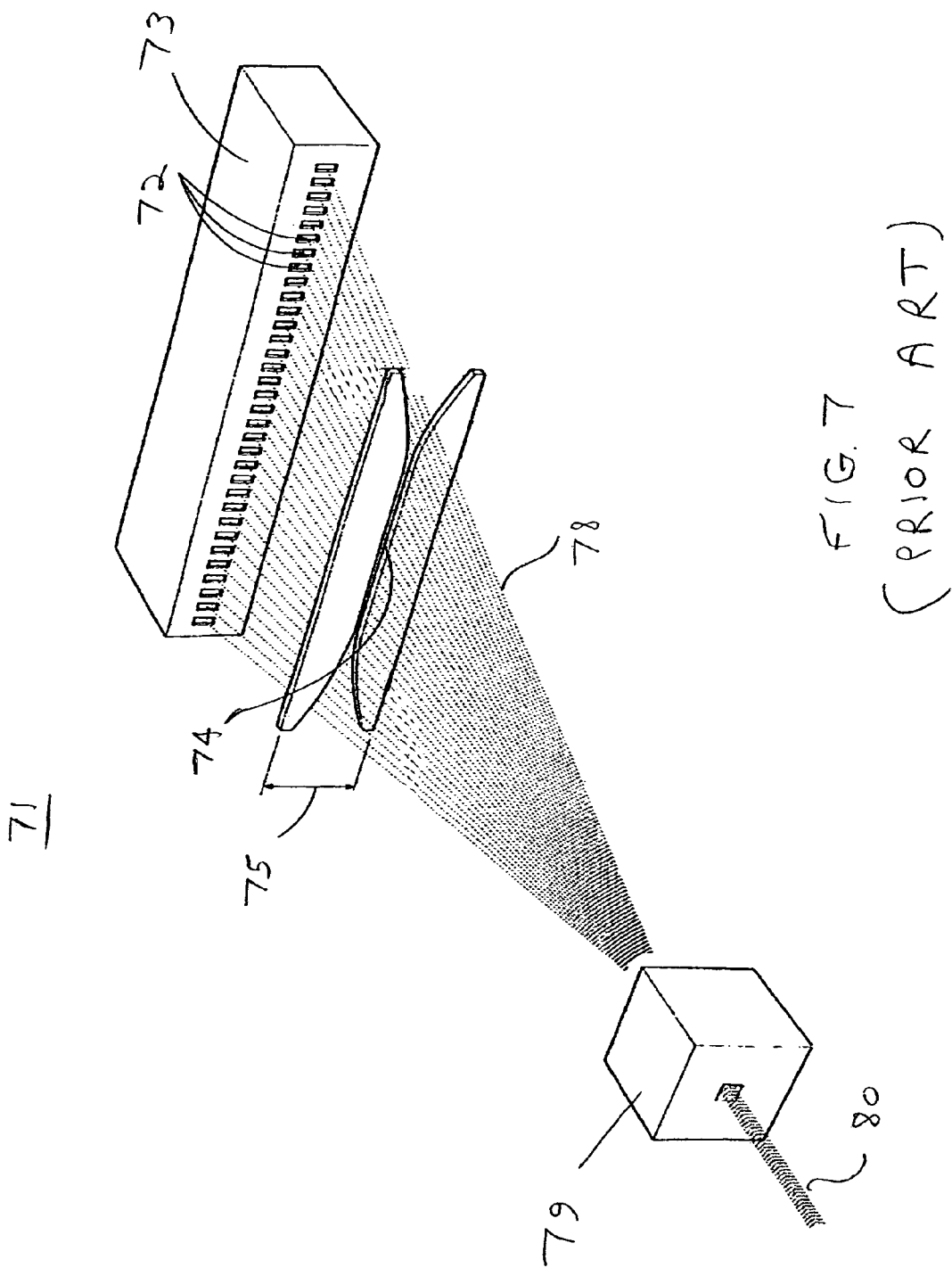
FIG. 7 is a schematic diagram of another conventional dispersive spectrometer.

Referring now to FIG. 5, there is shown an exemplary embodiment of the present invention. As shown, a dispersive spectrometer system, generally designated as 50, includes light gathering optics 54 which receives light within field-of-view 52. The field-of-view is oscillated or modulated by oscillator/modulator 55 to provide an oscillating line of sight (LOS) 53a, 53b. The LOS may be oscillated by a sinusoidal waveform or any other periodic waveform. Frequency and phase controller 56 provides the appropriate waveform to oscillator/modulator 55 for controlling the oscillation or modulation.

The light is gathered by light gathering optics 54 and passed through slit 57 (for example), into dispersing optics 58. Dispersing optics 58 (for example, a prism or a grating) disperses the incoming light into its constituent wavelengths. The dispersed light is then projected onto focal planar array (FPA) 59. The focal planar array may be an array of pixels of a CCD (for example), or an array of individual detectors, that are sensitive to different regions of the spectrum. The detected output from the individual detectors, or pixels, of FPA 59 is provided to signal current detector 51, which is also synchronized to the predetermined waveform generated by frequency and phase controller 56. Accordingly, if the controller provides a sinusoidal oscillation frequency of $f_0$, then the current detector detects the sinusoidal oscillation at frequency $f_0$.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for measuring scene inhomogeneity comprising the steps of:

(a) directing radiance of a scene into a dispersive spectrometer;
(b) changing a field-of-view (FOV) of the spectrometer, while directing the radiance of the scene into the spectrometer;
(c) processing the radiance of the scene to obtain a signal;
(d) measuring an amplitude of the signal; and
(e) determining scene inhomogeneity based on the measured amplitude of the signal.

2. The method of claim 1 wherein
step (b) includes uniformly oscillating the FOV of the spectrometer; and
step (c) includes obtaining a sinusoidal signal based on uniformly oscillating the FOV of the spectrometer.

3. The method of claim 1 wherein
step (b) includes using a periodic waveform to change the FOV of the spectrometer; and
step (c) includes obtaining a signal having a periodic waveform proportional to the periodic waveform used to change the FOV of the spectrometer.

4. The method of claim 3 wherein
step (b) includes changing the FOV of the spectrometer using one of a sinusoidal waveform, a pulse code modulated waveform, or a pseudo-random waveform; and
step (c) includes obtaining a signal having a waveform proportional to the waveform used to change the FOV of the spectrometer.

5. The method of claim 1 wherein
step (c) includes processing the radiance of the scene detected by a spectral bin of the dispersive spectrometer, and
calculating a Fourier transform of the radiance detected by the spectral bin to obtain the signal.

6. The method of claim 5 wherein
step (c) includes detecting the radiance of the scene by a pixel of the dispersive spectrometer.

7. The method of claim 5 wherein
step (c) includes processing the radiance of the scene detected by multiple spectral bins of the dispersive spectrometer, and
summing the detected radiances from the multiple spectral bins to increase a signal to noise ratio (SNR) of the signal.

8. The method of claim 1 wherein
the FOV of the spectrometer includes a boundary of length s, in units of radians, and
step (b) includes periodically changing a line of sight (LOS) of the spectrometer, perpendicular to the length of s.

9. The method of claim 8 wherein
step (b) includes periodically changing the LOS of the spectrometer at a frequency of f and at an amplitude of about 5 percent of the length of s, and
periodically changing the LOS at a time interval that is about ten times shorter than a dwell time of the LOS.

10. The method of claim 1 wherein
step (e) includes determining that the scene is inhomogeneous, when the measured amplitude of the signal is larger than a noise component of the signal, and
determining that the scene is homogeneous, when the measured amplitude of the signal is equal to or smaller than the noise component of the signal.

11. A system for measuring scene inhomogeneity comprising
a dispersive spectrometer having a field-of-view (FOV) for receiving radiance of a scene,
a controller coupled to the dispersive spectrometer for changing the FOV,
a detector for detecting an amplitude of the received radiance of the scene, and
a processor for determining scene inhomogeneity, based on the amplitude of a signal provided from the detector.

12. The system of claim 11 wherein
the controller is configured to modulate the FOV at a periodic interval, using one of a sinusoidal waveform, a pulse code modulated waveform, or a pseudo-random waveform, and
the processor is configured to determine scene inhomogeneity, based on the signal provided from the detector having a waveform similar to the waveform used to modulate the FOV by the controller.

13. The system of claim 11 wherein
the spectrometer includes light gathering optics for providing the FOV for receiving radiance of the scene, and
the controller is coupled to the light gathering optics for changing the FOV.

14. The system of claim 11 wherein
the detector includes a spectral bin for detecting the radiance of the scene at a predetermined wavelength.

15. The system of claim 11 wherein
the detector includes a focal planar array (FPA) for detecting the radiance of the scene and providing multiple output signals from the FPA, and
the processor includes an adder for summing the multiple output signals from the FPA.

16. The system of claim 11 wherein
the detector includes multiple spectral bins for detecting the radiance of the scene and providing multiple output signals from respective spectral bins, and
the processor includes an adder for summing the multiple output signals from the respective spectral bins.

17. The system of claim 11 wherein
the processor is configured to determine that the scene is inhomogeneous, when the amplitude of the signal is larger than a noise component of the signal, and
the processor is configured to determine that the scene is homogeneous, when the measured amplitude of the signal is equal to or smaller than the noise component of the signal.

18. The system of claim 11 wherein
the FOV of the spectrometer includes a boundary of length s, in units of radians, and
the controller is configured to periodically change the FOV of the spectrometer, at a line of sight (LOS) having an angle that is perpendicular to the length of s.

19. The system of claim 18 wherein
the controller is configured to periodically change the FOV of the spectrometer at a frequency of f and at an amplitude of about 5 percent of the length of s, and
periodically change the FOV at a time interval that is about ten times shorter than a dwell time of the FOV.

20. The system of claim 11 wherein
the processor includes a module for calculating a Fourier transform of the signal provided from the detector.

* * * * *